United States Patent [19]
Smith

[11] 3,881,983
[45] May 6, 1975

[54] RING FORMING MACHINE
[75] Inventor: Bruce N. Smith, Seabrook, N.H.
[73] Assignee: Spherex, Inc., Seabrook, N.H.
[22] Filed: Nov. 13, 1972
[21] Appl. No.: 305,991

[52] U.S. Cl. ............... 156/404; 156/112; 156/122; 156/140; 156/217; 156/244; 156/258; 156/304; 156/443; 156/499; 156/500; 264/295; 425/392
[51] Int. Cl. .......................................... B29h 11/00
[58] Field of Search........ 156/404, 112, 110 R, 122, 156/140, 217, 244, 258, 304, 443, 499, 500; 425/392; 264/295, 339; 150/151

[56] References Cited
UNITED STATES PATENTS

| | | | |
|---|---|---|---|
| 1,622,546 | 3/1927 | Seiberling | 156/258 X |
| 2,340,267 | 1/1944 | Haase | 156/406 |
| 2,384,014 | 9/1945 | Cutler | 156/499 X |
| 2,647,555 | 8/1953 | Hinman | 156/258 X |
| 2,971,224 | 2/1961 | Overholser | 264/339 X |
| 3,417,434 | 12/1968 | Hafner | 425/392 |

*Primary Examiner*—Clifton B. Cosby
*Attorney, Agent, or Firm*—Norman S. Blodgett; Gerry A. Blodgett

[57] ABSTRACT

Apparatus for forming annular articles from elongated workpieces of thermoplastic material is provided with clamps for grasping the ends of the workpiece, and a heating plate with two opposed surfaces; the clamps apply the ends of the workpiece to the plate to heat them and then bring the ends together.

30 Claims, 20 Drawing Figures

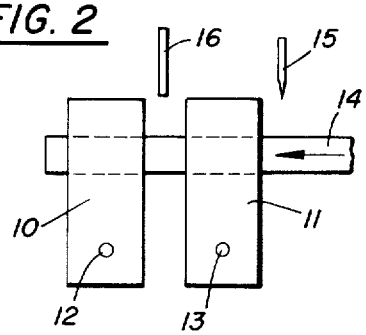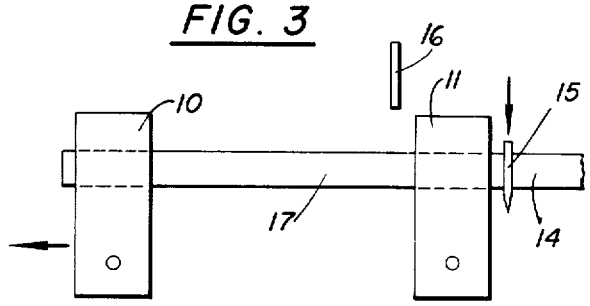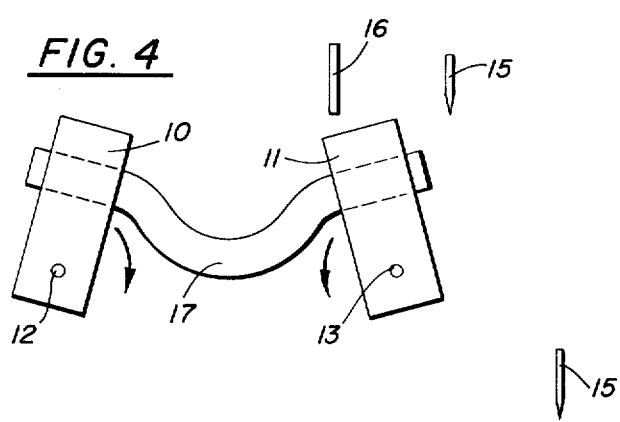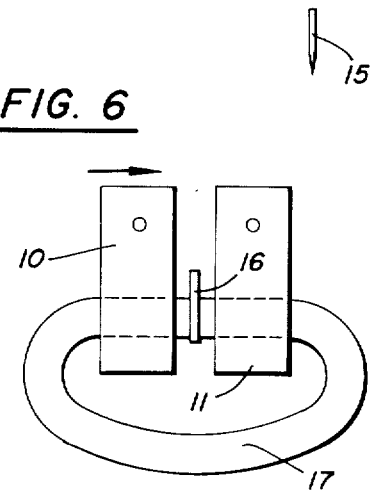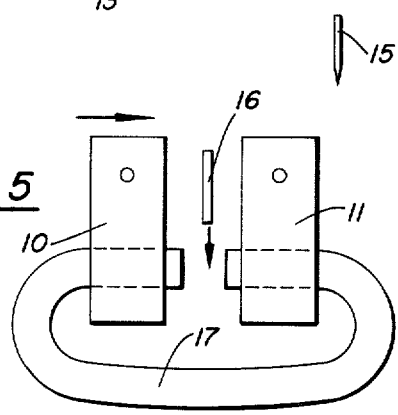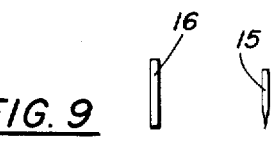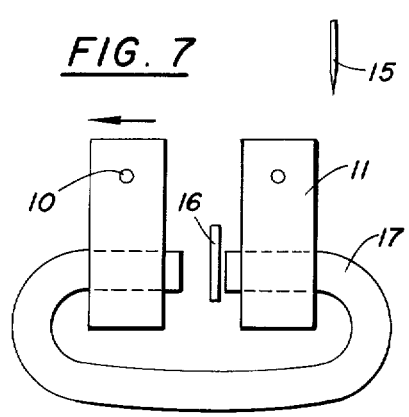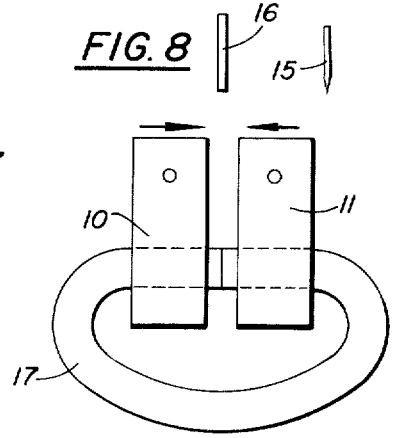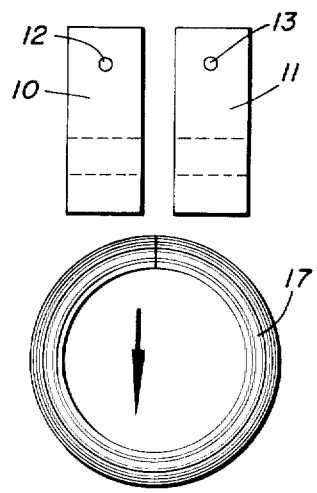

3,881,983

1
RING FORMING MACHINE

BACKGROUND OF THE INVENTION

In many industries, the forming of thermoplastic annular articles is important. One case, is the fabrication of solid elastomer baby carriage tires. The nature of the market is such that the tires must be made very inexpensively, yet a pleasing appearance is quite important. Injection molding of the tires is an expensive operation which severely limits the cross-sectional shape of the product. An important shape embellishment is the provision of circumferential grooves in the outside surface or tread of the tire. These grooves are not only desirable for appearance, but also result in a smooth rolling tire. They are, however, quite difficult to form using molding techniques. It is felt that a method which should give good results would be the combination of extruding material in a non-circular cross-section, cutting off suitable lengths, and uniting the ends to form a ring. The equipment which has been provided in the past for performing such tasks has been plagued with problems. Uniting the two ends of a workpiece of non-circular cross-section without providing for maintenance of good registration, i.e., shape-to-shape conformance, has resulted in an unsightly and out-of-round "scar". Futhermore, the old methods of melting the workpiece ends to make a bond have resulted in deformation and the formation of "flash". Another factor in ring formation is that the forming operation is best carried out where the workpiece is fresh from the extruder. Synchronizing a discrete operation like this method of wheel formation with a continuous operation like extrusion must be accomplished for an efficiently operating machine.

These and other difficulties experienced with the prior art apparatus have been obviated in a novel manner by the present invention.

It is, therefore, an outstanding object of the invention to provide a machine for uniting the two ends of an elongated piece of thermoplastic material to form a ring or annulus.

Another object of this invention is the provision of a machine adapted to transform a continuously-extruded material into annular rings.

A further object of the present invention is the provision of a machine for forming rings from linear material by uniting the ends so that accurate registration of non-circular cross-sections is achieved.

It is another object of the instant invention to provide a machine for connecting pieces of thermoplastic material without forming flash.

A still further object of the invention is the provision of a machine for forming rings in which the finished ring can be simply allowed to fall from the work area without interference with portions of the machine.

It is a further object of the invention to provide a machine for forming rings which machine is of such simplicity that its initial and maintenance cost are low.

With these and other objects in view, as will be apparent to those skilled in the art, the invention resides in the combination of parts set forth in the specification and covered by the claims appended hereto.

SUMMARY OF THE INVENTION

This invention involves apparatus for the production of annular articles from elongated workpieces of thermoplastic material. The apparatus involves two clamps which grasp the ends of the workpiece and means for turning the clamps to cause the ends to be adjacent one another. A heated plate is also provided to heat the workpiece ends and means is provided to contact the softened ends to unite them. In order to achieve good registration for workpieces of non-circular cross-section, a Vee-shaped groove is formed in the workpiece and conforming wedges are formed in the clamps. The ends are melted by presenting the adjacent ends of the workpiece to opposite faces of a heating plate. The ends are drawn away from the plate before it is moved to prevent formation of flash.

BRIEF DESCRIPTION OF THE DRAWINGS

The character of the invention, however, may be best understood by reference to one of its structural forms, as illustrated by the accompanying drawings, in which:

FIGS. 2–9 are a series of diagrammatic representations of the operation of important elements of the present invention.

DESCRIPTION OF THE PREFERRED EMBODIMENT

Figure 1:
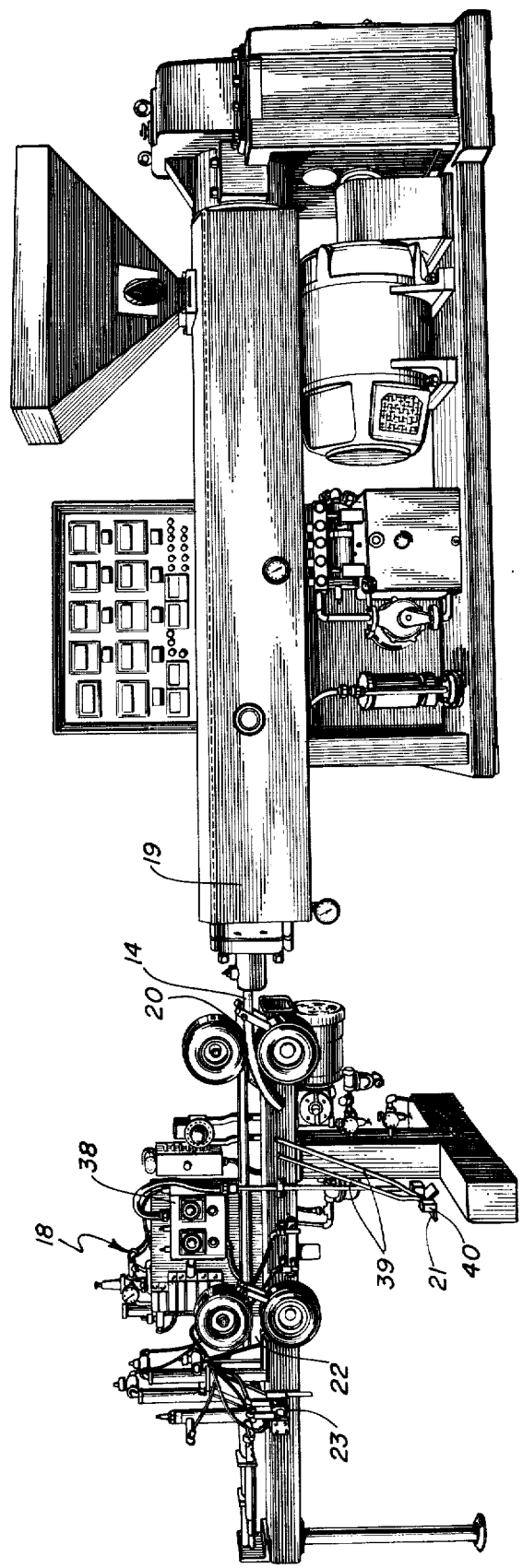
FIG. 1 is a perspective view of the apparatus embodying the principles of the present invention, shown in conjunction with an extruder.

Before beginning a detailed description of the construction and operation of the present invention, a simplified description of the operation might be useful. A reference to FIGS. 2 through 9 will be useful for that purpose. FIG. 2 represents the beginning of a cycle, in which a lefthand clamp 10 and a righthand clamp 11, pivotally mounted on lines through points 12 and 13 respectively, are grasping a portion of an extruded cylinder 14. Over the cylinder 14 is a cutting blade 15 and a hot plate 16. At this time, lefthand clamp 10 has the cylinder 14 in a tight grip, whereas righthand clamp 11 holds the cylinder 14 in a sliding grip.

In FIG. 3, the left hand clamp 10 has been moved to the left, drawing with it the end of the cylinder 14. At a predetermined point, the motion of the lefthand clamp 10 stops, the righthand clamp 11 exerts a firm grip on the cylinder 14 and cutting blade 15 descends, severing the cylinder 14 and forming a workpiece 17.

On FIG. 4, the cutting blade has retracted and the clamps have begun turning inward on their pivots 12 and 13.

FIG. 5 shows the clamps which have moved 180°. The lefthand clamp 10 is moving to the right and the hot plate 16 is descending.

In FIG. 6, contact with the interposed plate 16 is achieved. Because the plate 16 is flexibly mounted, pressure executed by movement of lefthand clamp 10 is equally distributed on each side of the hot plate 16. Contact time and temperature of the hot plate 16 are present to properly melt the end-surfaces of the workpiece 17.

FIG. 7 shows that just before extracting the hot plate 16 from between the ends, the lefthand clamp 10 is slightly retracted to the left, thereby relieving the pressure on the melted ends and allowing removal of the plate 16 without deformation of the ends.

In FIG. 8, the hot plate 16 has been removed and the workpiece ends forced together and allowed to seal.

FIG. 9 shows the clasps releasing the workpiece 17 and allowing it to fall from the equipment. An inverse set of motions return the system to its initial position.

Having presented a simplified view of the operation of the present invention, a machine representing a practical embodiment will be described. Referring first to FIG. 1 wherein are best shown the general features of the invention, the ring forming machine, indicated generally by the numeral 18, is shown to involve an extruder 19, an acceptor section 20, a take-up section 21, a pre-feed section 22, a processing section 23 and a control system 38.

Figure 19:
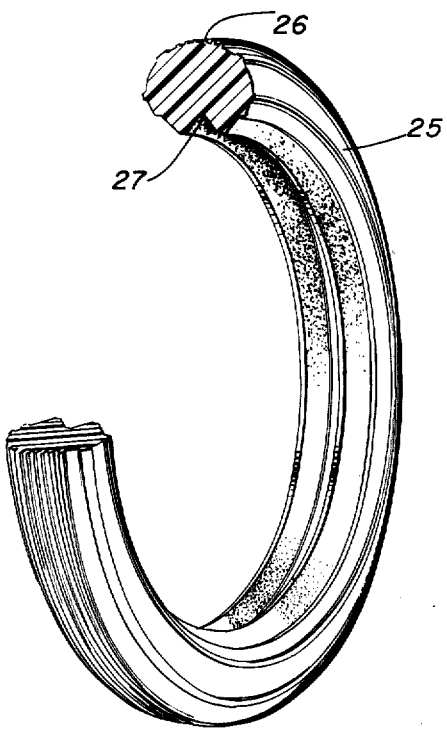
FIG. 19 is a perspective view in partial cross-section of a tire constructed in accordance with the principles of the present invention.

The extruder 19 is a standard model which provides a cylinder 14 of thermoplastic, the cylinder 14 having a cross-section similar to the cross-section of the tire 25 shown in FIG. 19. Features of this tire shape which should be noted, are the circumferential lands and grooves 26 on the outer surface, and the annular Vee-shaped groove 27 on the inner surface. The former is important because it is a desirable feature which is difficult to form using standard tire forming techniques, and the latter is important in assisting shape registration as will be seen later.

Figure 12:
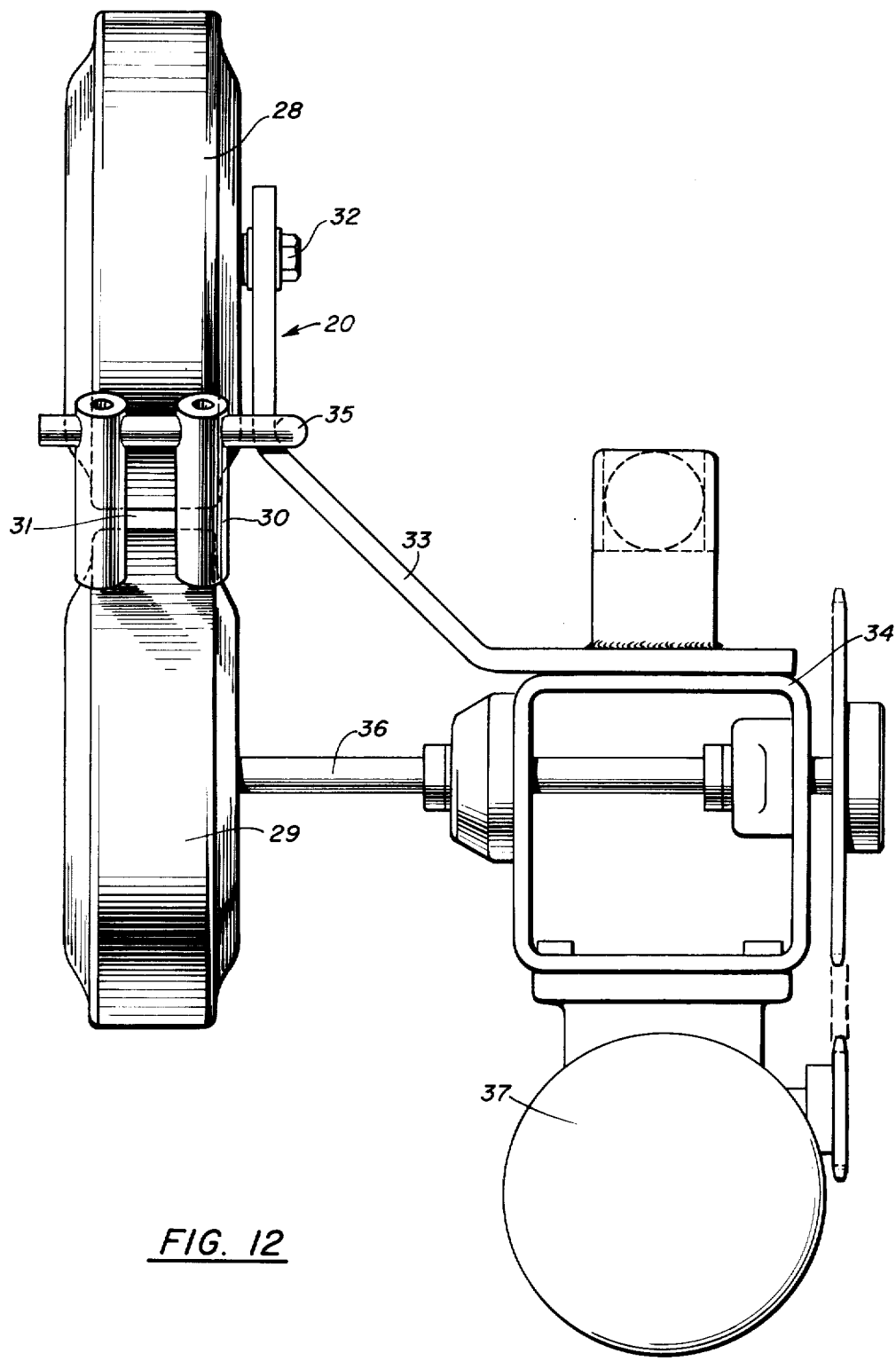
FIG. 12 is a side elevational view taken along line XII—XII of FIG. 10.

Referring to FIG. 12, the acceptor section 20 is shown as seen from the extruder 19. This section includes two wheels 28 and 29 and a guide 30 which define a path 31 through which the cylinder 14 passes. Upper wheel 28 is an idler and is rotatably mounted by shaft 32 to arm 33 which is in turn attached to the base 34. Guide 30 is attached by connector 35 to arm 33. Lower wheel 29 is attached to shaft 36 which is rotatably mounted in the base 34 and the shaft 36 and wheel 29 are driven by motor 37.

The take-up section 21 includes two arms 39 and photo cell 40.

Figure 10:
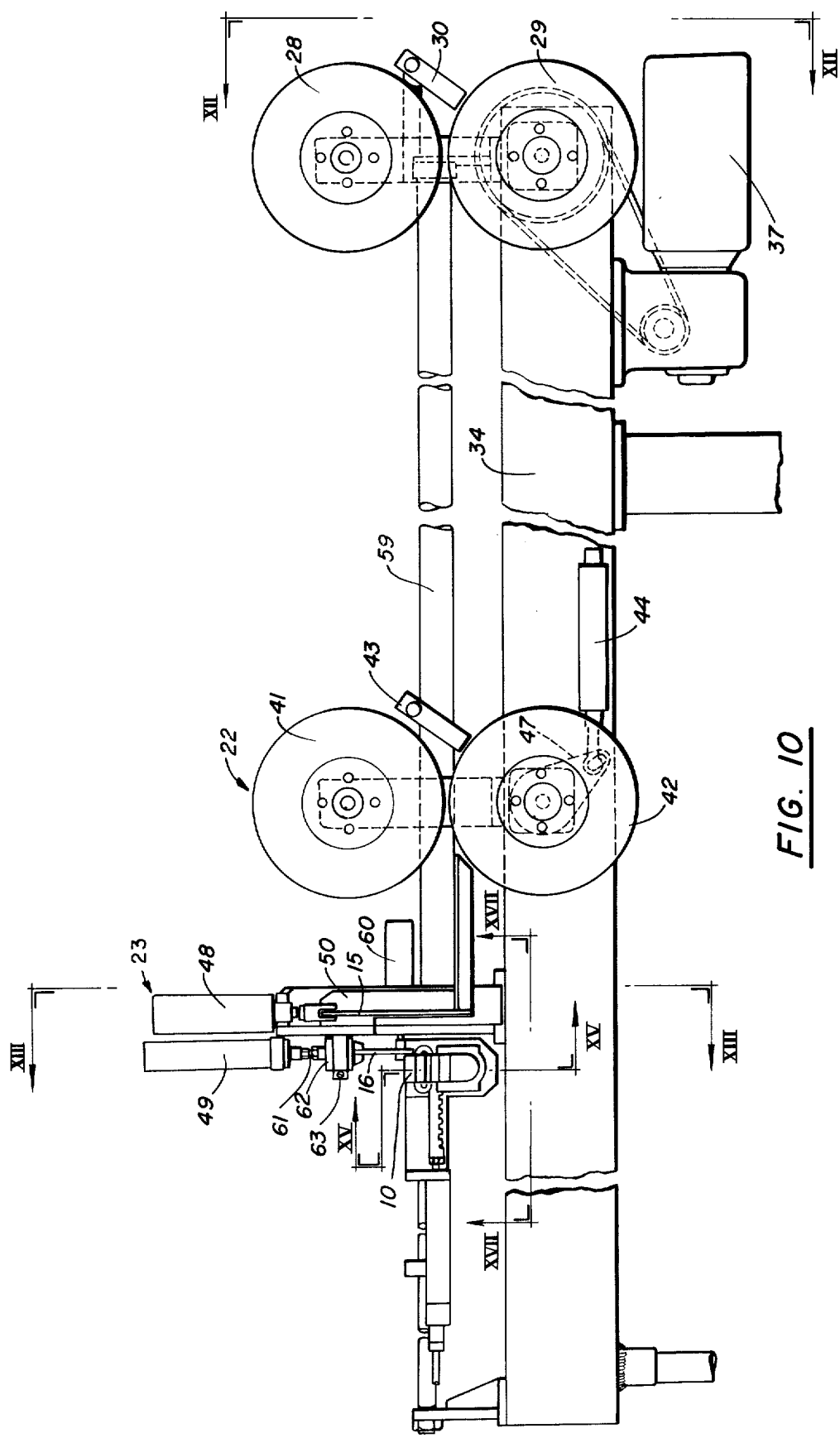
FIG. 10 is a front elevation view of the apparatus.
Figure 11:
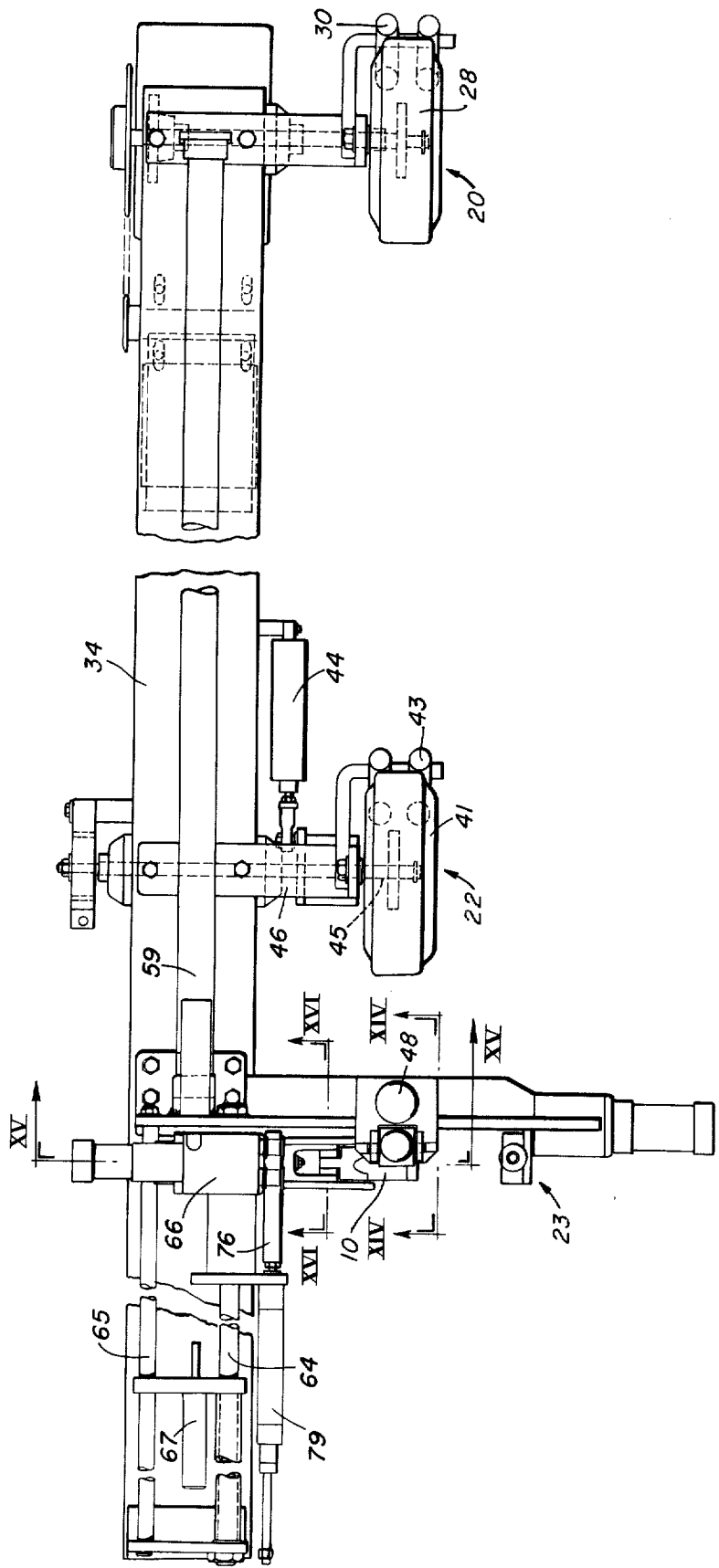
FIG. 11 is a plan view of an apparatus.

Referring to the FIGS. 10 and 11, the pre-feed section 22 is shown in front top view respectively. The pre-feed section 22 includes two wheels 41 and 42, a guide 43 and a pneumatic pre-feed cylinder 44. Upper wheel 41 is an idler and is rotatably mounted by shaft 45 to arm 46 which is mounted on the base 34. Guide 43 is also mounted on arm 46. Lower wheel 42 is rotatably mounted to the base and carries an arm 47. Pre-feed cylinder 44 is connected between the outboard end of arm 47 and the base 34. The cylinder 44 is thus capable of rotating lower wheel 42 back and forth through about 45°.

Figure 13:
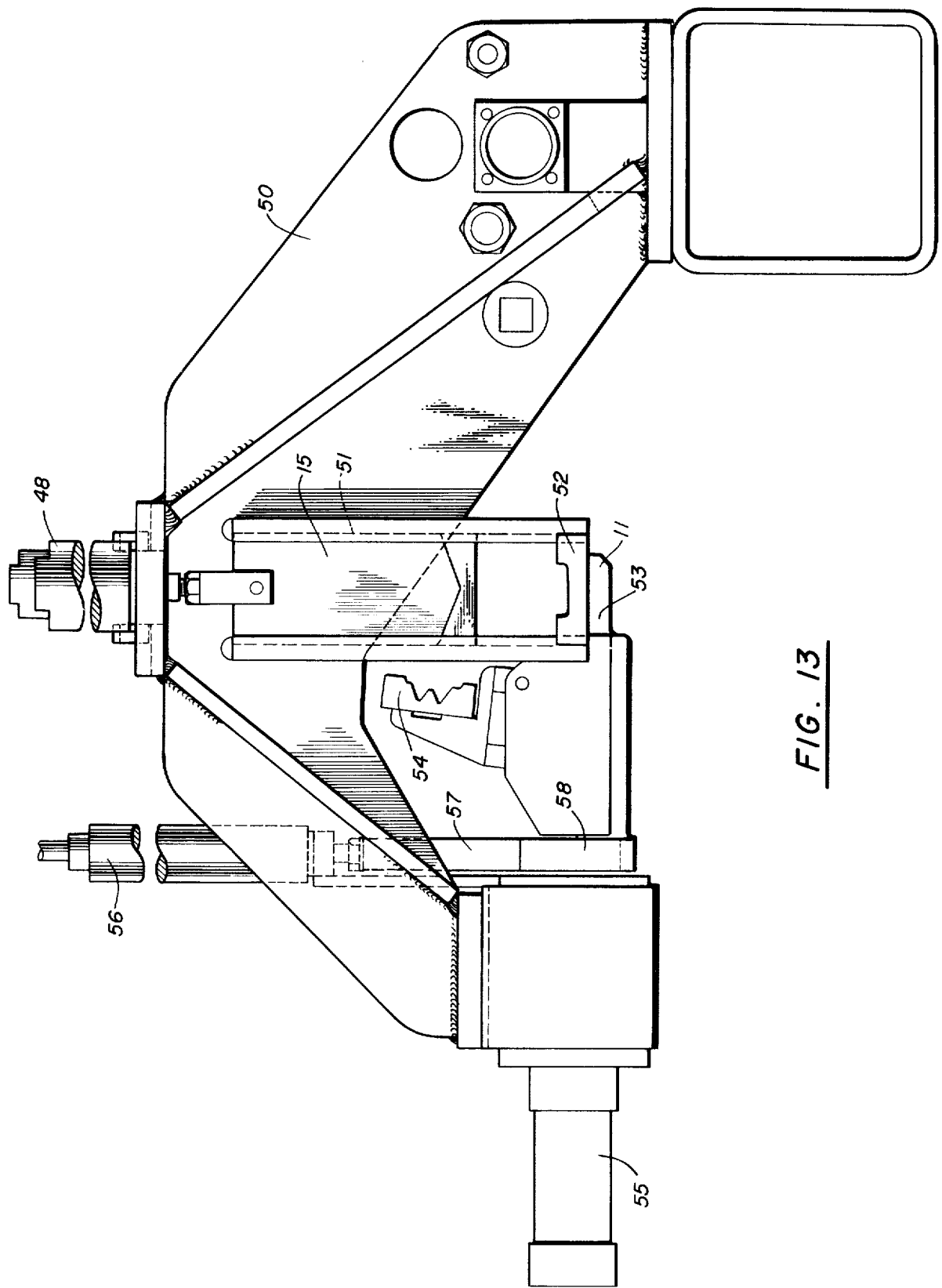
FIG. 13 is a side elevational view taken along line XIII—XIII, of FIG. 10.

The processing section 23 can be subdivided into four units. The cutting blade 15 and its driving pneumatic cylinder 48, and the hot plate 16 and its driving pneumatic cylinder 49 are shown in FIG. 10. The position of right hand clamp 11 is shown in FIG. 13. The position of left hand clamp 10 is shown in FIGS. 10 and 11 with details in FIGS. 14, 15, 16 and 17.

Referring to FIG. 13, support arm 50 is shown carrying the cutting blade assembly consisting of the cutting blade 15, the driving cylinder 48, the blade track 51 and the cutting bed 52. The support arm 50 also carries the right hand clamp assembly consisting of the right hand clamp 11 having a stationary jaw 53 and a moving jaw 54, right hand grip cylinder 55 which causes the two jaws to close, and rotate cylinder 56. The drive train between right hand cylinder 55 and moving jaw 54 is similar to that of the left hand clamp which will be discussed later. The rotate cylinder 56 causes rotation of right hand clamp 11 through a rack 57 and pinion gear 58. The rotation is about the axis of pinion gear 58. It is important to note the moving jaw 54 has an inwardly directed wedge which engages the Vee-shaped groove 27 on the extruded cylinder 14. Also fastened to support arm 50, but best shown in FIG. 10, are traverse cylinder 59, gap cylinder 60 and the hot plate assembly. The hot plate assembly includes the hot plate 16 or sealer, the seal cylinder 49 which moves the plate 16, and a fastener 61 which not only connects the hot plate 16 and seal cylinder 49, but also provides heat for the hot plate 16. The fastener 61 carries on its periphery a heat insulator 62 and a resilient bumper 63, the bumper biasing the hot plate away from the support arm 50 and right hand clamp 11 by contacting the support arm 50.

The last sub-unit of the processing section 23 is the left hand assembly. This assembly, as shown in FIG. 11, includes tracks 64 and 65, the left hand clamp unit 66 which moves along the tracks, and traverse cylinder 59 which controls movement of the left hand clamp unit 66 along the tracks. The assembly also includes gap cylinder 60, which has over-riding control of the unit 66 movement on the tracks at their right end, and traverse buffer cylinder 67 which monitors unit movement at the left end of the tracks.

Figure 14:
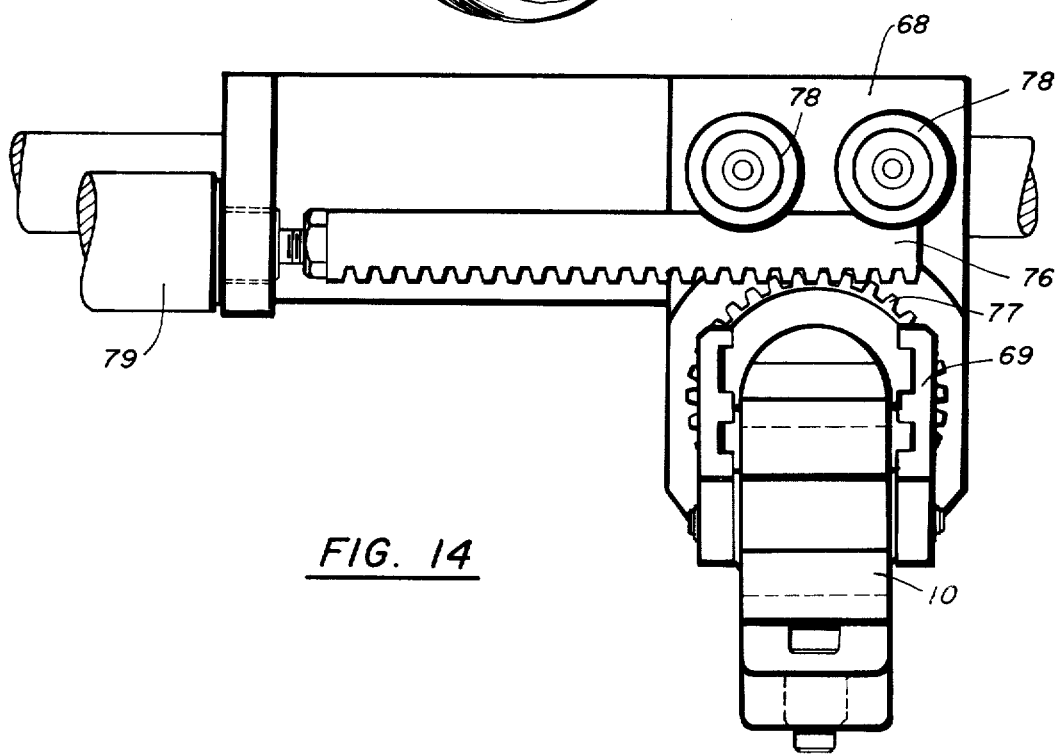
FIG. 14 is a front elevational view taken along line XIV—XIV of FIG. 11.
Figures 15, 16:
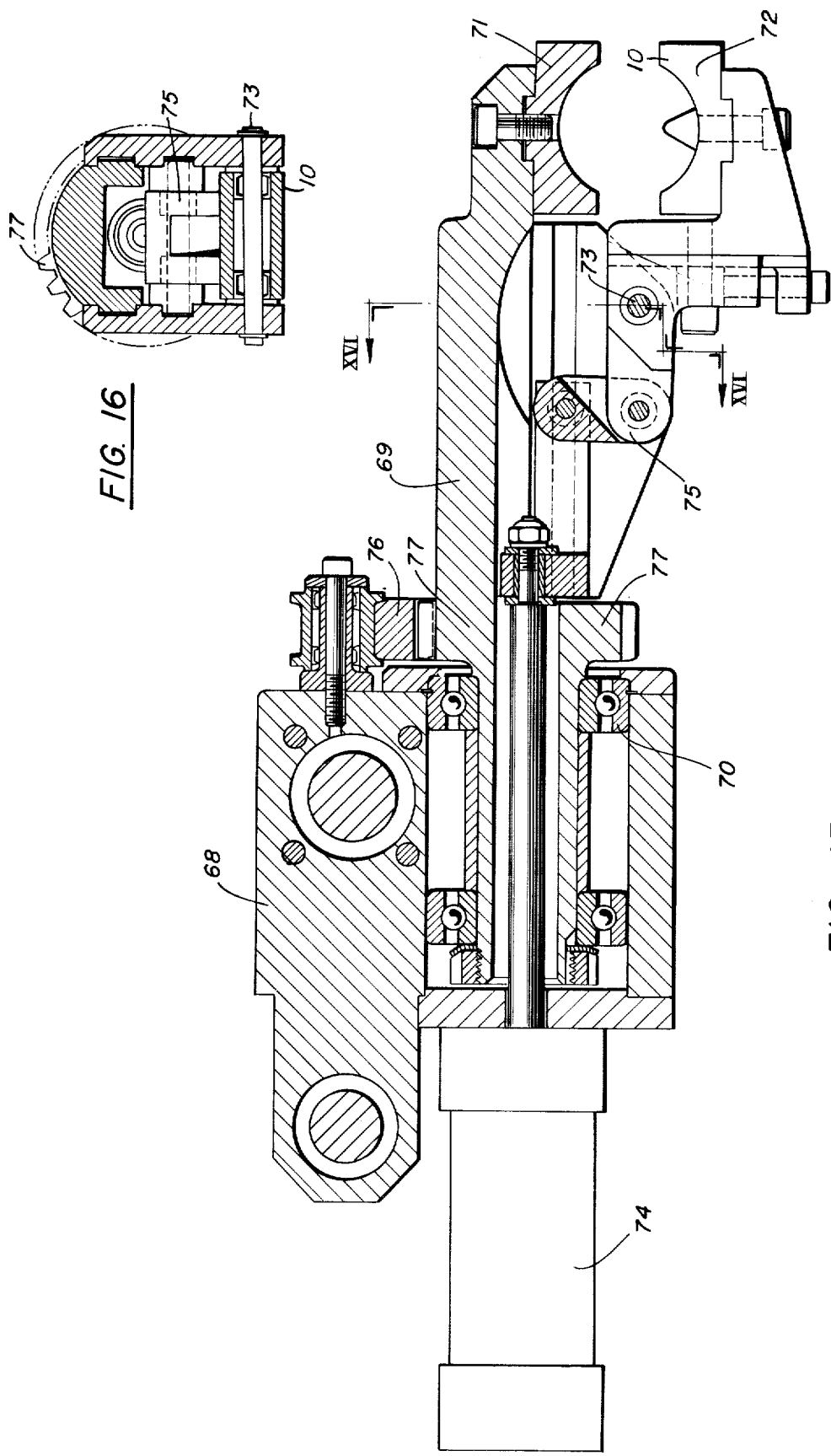
FIG. 15 is a view in partial section taken along the line XV—XV of FIG. 11.
FIG. 16 is a view in partial section taken along the line XVI—XVI of FIG. 15.
Figure 17:
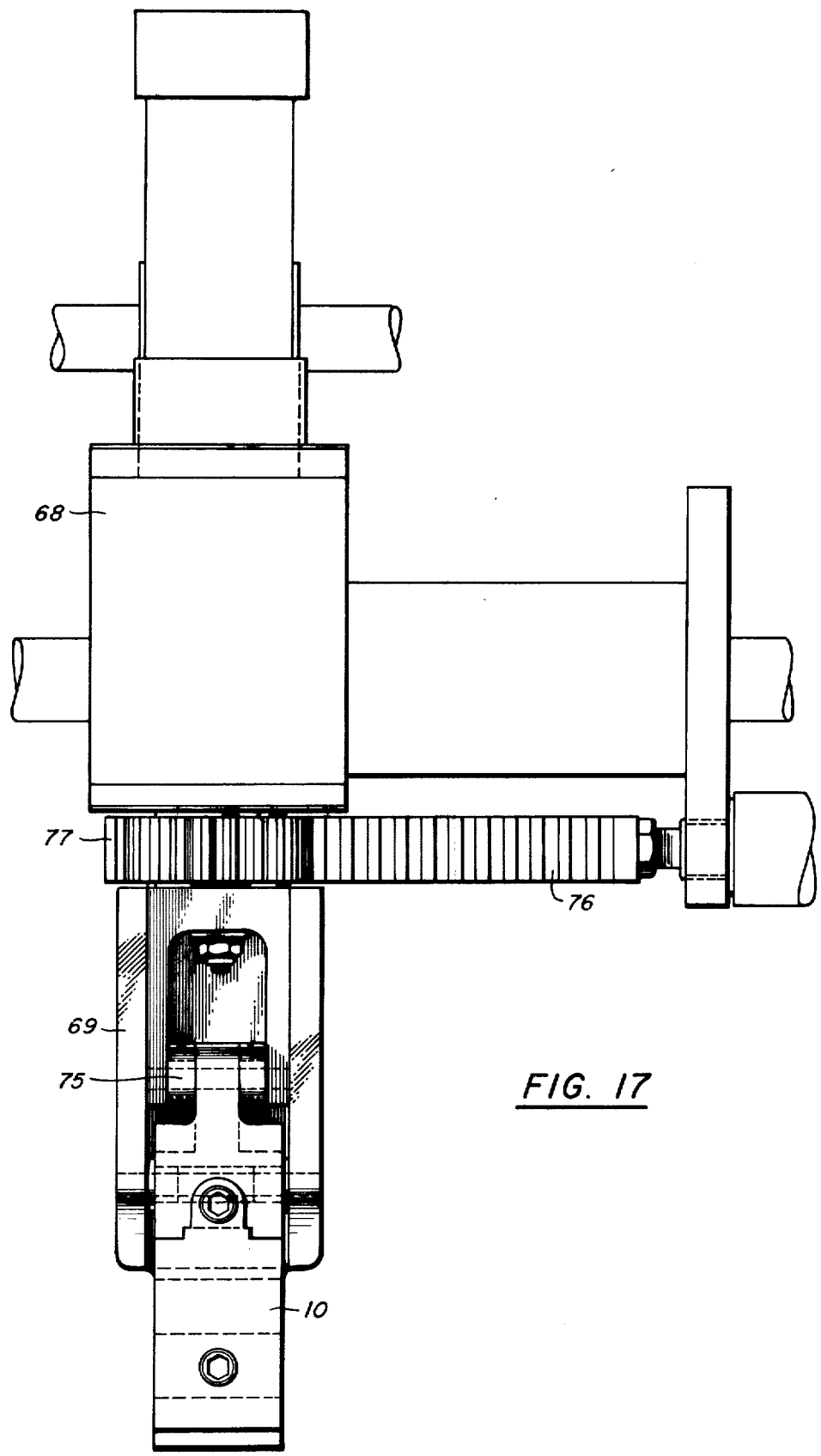
FIG. 17 is a bottom view taken along line XVII—XVII of FIG. 10.

Referring to FIGS. 14, 15, 16, and 17, the left hand clamp unit 66 itself consists of a base 68 which moves on the tracks 64 and 65, and support arm 69 rotatably mounted on base 68 in bearings 70. The arm 69 fixedly carries a stationary jaw 71 and moveably carries moveable jaw 72 at pivot 73. Along the axis of rotation of the support arm 69, left hand grip cylinder 74 acts through toggle 75 to open and close the jaws. The toggle 75 is positioned to produce a closed jaw situation which is very difficult to overcome at the clamp end. A similar actuating system is used in the right hand clamp unit. Rotation of the support arm 69 in the base 68 is accomplished by the action of rack gear 76 on pinion gear 77, which is fixed to the support arm 69. FIG. 14 shows the arrangement of base 68, support arm 69, pinion gear 77 and rack 76. It also shows rollers 78 which hold the rack against the pinion and rotate cylinder 79 which drives the rack.

Figure 18:
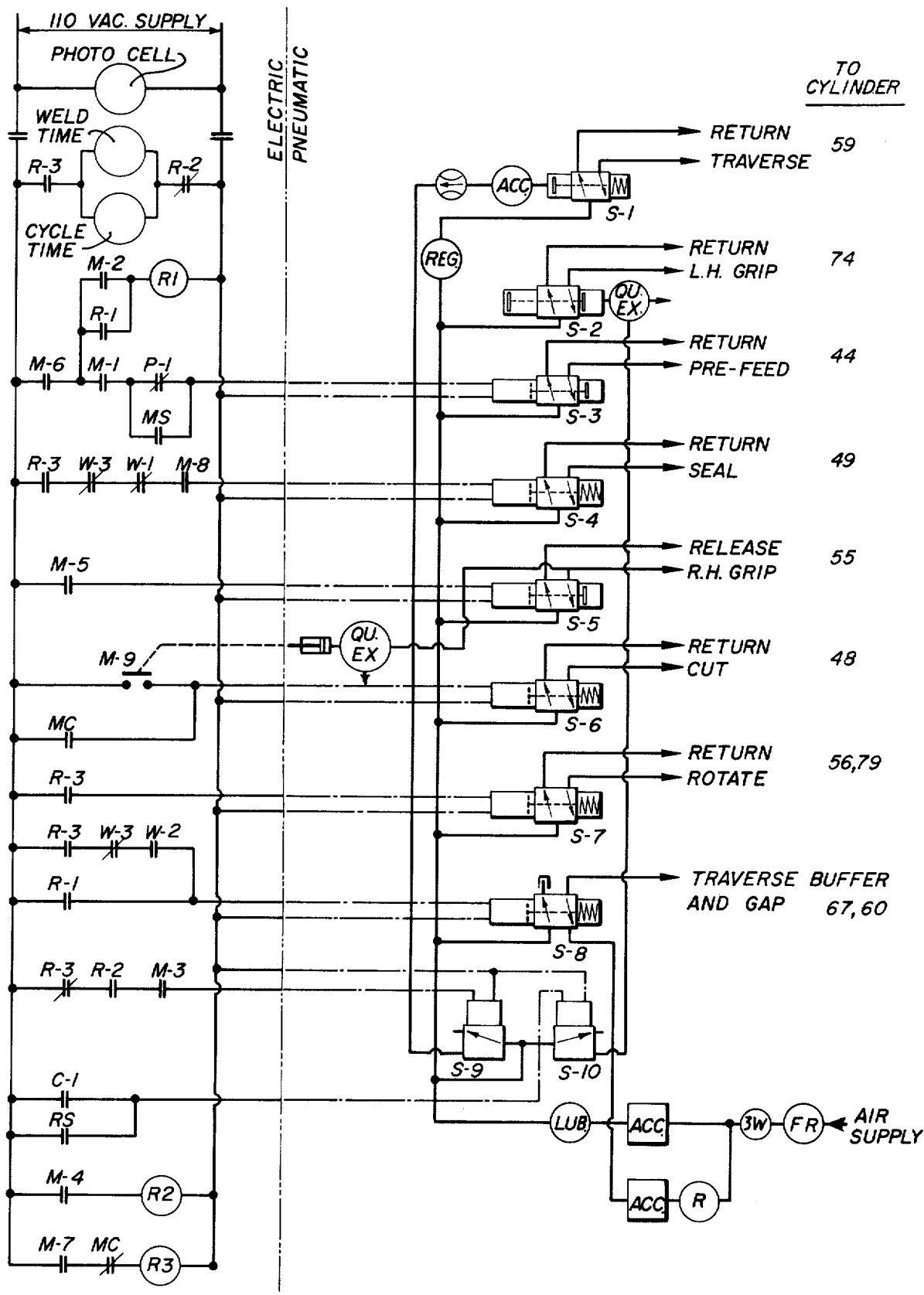
FIG. 18 is a diagrammatic representation of the electrical and pneumatic circuits of the apparatus.
Figure 20:
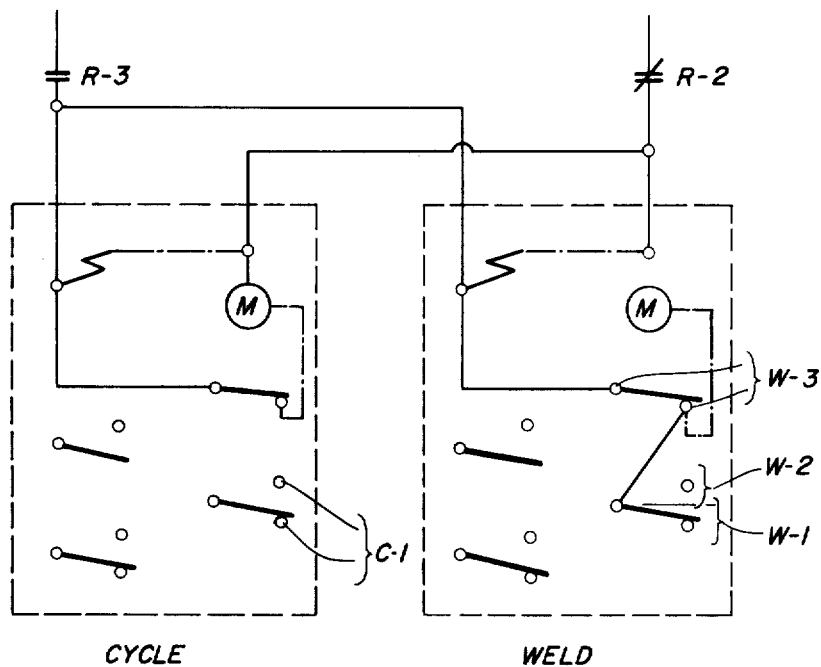
FIG. 20 is a diagrammatic representation of the wiring of timers used in the present invention.

The last system, the control system 38 is shown diagrammatically in FIG. 18 and consists of a combination of known elements organized to carry out, through the mechanism described above, the ring forming operation previously presented.

The use and operation of the invention will now be readily understood in view of the above description. In is starting position, looking at FIG. 1, the extruded cylinder 14 is being drawn from the extruder by the wheels of the acceptor section 20, and the free end is held by the pre-feed section 22. The length in between is allowed to hang in the take-up section 21 and when a sufficient amount has accumulated, the photo cell 40 will be energized, closing switch P-1. Assuming that the pre-feed cylinder 44 and the cutting blade cylinder 48 are both retracted, then the switches M-1 and M-6 are closed and solenoid S-3 starts pre-feed cylinder 44 to the right. This motion opens M-1 and closes switch M-2 and R-1. The closing of R-1 continues movement of pre-feed cylinder 44, and extends both the traverse buffer cylinder 67 and the gap cylinder 60 using solenoid S-8. The movement of these cylinders close switch M-4, thus activating relay R2 and closing switch R-2. When the starch M-3 closes, indicating the pre-feed cylinder 44 is at full stroke, the traverse cylinder 59 begins to move. It should be understood that the action of the pre-feed cylinder 14 results in the introduction of the extruded cylinder 44 into the processing section 23. At the beginning of the cycle the processing section is in a position shown diagrammatically in FIG. 2. The cutting blade 15 and the hot plate 16 are both in their highest position and the left hand clamp 10 is positioned to the right, with both clamps extending upward from their axes of rotation. The extruded cylinder 14 is fed under the cutting blade, through right hand clamp 11, under the hot plate 16 and through the left hand clamp 10.

Simultaneously, with the beginning of transverse movement, solenoid S-2 is activated to close left hand clamp 10 on the end of extruded cylinder 14, using left hand grip cylinder 74. Because the effect of traverse is to move the left hand clamp 10 to the left, the ultimate effect is to draw the end of extruded cylinder 14 through the processing section. This drawing continues until the left hand clamp base 68 contacts the traverse buffer cylinder 67. When the traverse buffer cylinder 67, which is adjustable along tracks 64 and 65, is fully retracted, switch M-5 is closed. The result is that solenoid S-5 and right hand grip cylinder 55 closes the right hand clamp around the extruded cylinder 14 while simultaneously closing switch M-9 thereby starting blade travel through solenoid S-6 and cutter blade cylinder 48. The cutting action opens switch M-6 and closes switch M-7. The former allows return of the pre-feed mechanism and retraction of the traverse buffer and gap mechanism through switch R-1, and the latter, through relay R3 and switches R-3, begins traverse return and starts rotation of the clamps. This rotation is effected through solenoid S-7 and cylinders 56 and 79.

The completed rotation closes switch M-8 which initiates lowering of the hot plate by seal or hot plate cylinder 49. This lowering along with the traverse of left hand clamp 10 to the right is shown in FIG. 5.

Eventually the traverse of left hand clamp 10 and the lowering of the hot plate 16 will result in contact of the two workpiece ends with the hot plate.

The contact time is governed by timers in the usual way, with termination occurring with a pulse-like extension of gap cylinder 60 which overrides, momentarily, in the leftward direction, the rightward movement of the left hand clamp base 68. During the retraction of contact with the hot plate, the hot plate is lifted upward and out of the way. As a result, when the pulse of the gap cylinder stops, the return of rightward traverse causes contact of the now molten ends of the workpiece 17. Two important interactions are involved here. It should be noted that the weld timer is set up so that when the hot plate contact has been sufficient, contact W-1 opens and W-2 closes, slightly before W-3 opens. Because of built-in time lags, the raising of the hot plate brought on by the opening of contact W-1 follows slightly the initiation of the retraction of plate contact brought on by closing of W-2. The subsequent opening of W-3 stops the contact retraction. The effect is to eliminate workpiece end pressure on the hot plate before it is lifted. This result is important in eliminating distortion of the molten workpiece ends. Assisting in this arrangement is resilient bumper 63 which biases the hot plate away from the workpiece end associated with the right hand clamp 11. This means that hot plate-workpiece end contact only takes place when pressure is applied to the hot plate by the workpiece end associated with the left hand clamp 10.

Return of the left hand clamp causes contact of the molten workpiece ends. When the welding of the ends of the workpiece together is completed, the right hand and the left hand clamps simply release the finished tire, which falls unobstructed into a bin. The return of the machine elements to their starting position should be obvious in view of the above description.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for the production of annular articles from elongated workpieces of thermoplastic material, the elongated workpiece having a first and a second end, comprising:
   a. a base,
   b. a first clamp movably attached to the base and adapted to grasp the first end of the workpiece,
   c. a second clamp movably attached to the base and adapted to grasp the second end of the workpiece,
   d. a heating plate movably mounted on the base and having first and second opposed, parallel surfaces,
   e. positioning means for presenting the first end of the workpiece to the first surface of the plate, and
   f. a manipulator which causes the second clamp to present the second end to the second surface of the plate,
      the elongated workpieces having a longitudinally-directed concave groove and each of the clamps including a protuberance of shape corresponding to the groove and positioned to engage the groove when the ends of the workpiece are held by the clamps.

2. Apparatus as recited in claim 1, wherein a cutting blade is provided which forms the elongated workpieces from a continuously extruding cylinder resulting from an extruder.

3. Apparatus as recited in claim 2, wherein a take-up area is provided between the cutting blade and the extruder and accumulation means is provided to indicate when a predetermined length of the extruded cylinder has accumulated within the area.

4. Apparatus for the production of annular articles from elongated workpieces of thermoplastic material, the elongated workpieces having a first and a second end, comprising:
 a. a base,
 b. a first clamp movably attached to the base and adapted to grasp the first end of the workpiece,
 c. a second clamp movably attached to the base and adapted to grasp the second end of the workpiece, the first clamp being rotatable on a first pivot which is fixed with respect to the base and the second clamp being rotatable on a second pivot which is movable with respect to the base,
 d. a heating plate movably mounted on the base and having first and second opposed, parallel surfaces,
 e. positioning means for presenting the first end of the workpiece to the first surface of the plate, and
 f. a manipulator which causes the second clamp to present the second end to the second surface of the plate.

5. Apparatus as recited in claim 4, wherein the positioning means and the manipulator each rotate their corresponding clamp 180° on the pivots from a first position to a second position when the workpiece is held on the clamp, the ends of the workpieces being directed away from each other in the first position and toward each other in the second position.

6. Apparatus as recited in claim 4, wherein said manipulator includes a first actuator and a second actuator which can, from time to time, override the first actuator, said actuators being used to change the spatial relationship between the second pivot and the base.

7. Apparatus as recited in claim 4, wherein a cutting blade is provided which forms the elongated workpieces from a continuously extruded cylinder resulting from an extruder.

8. Apparatus as recited in claim 7, wherein a take-up area is provided between the cutting blade and the extruder and accumulation means is provided to indicate when a predetermined length of the extruded cylinder has accumulated within the area.

9. Apparatus as recited in claim 4, wherein the elongated workpieces have a longitudinally directed concave groove and each of the clamps include a protuberance of shape corresponding to the groove and positioned to engage the groove when the ends of the workpiece are held by the clamps.

10. Apparatus as recited in claim 4, wherein the first clamp is rotatable on a first pivot which is fixed with respect to the base and the second clamp is rotatable on a second pivot which is movable with respect to the base.

11. Apparatus as recited in claim 4, wherein a biasing means is provided which maintains a predetermined distance between the hot plate and the first end at all times except when the second end is in contact with the hot plate.

12. Apparatus as recited in claim 4, wherein the plate can be placed in a position between the ends and the ends can be contacted with the plate, and the plate does not move from that position while one of the ends contact the plate.

13. Apparatus for the production of annular articles from elongated workpieces, the elongated workpieces having a first and a second end, comprising:
 a. a base,
 b. a first clamp movably attached to the base and adapted to grasp the first end of the workpiece,
 c. a second clamp movably attached to the base and adapted to grasp the second end of the workpiece,
 d. positioning means for presenting the first end of the workpiece to an imaginary traverse plane,
 e. a manipulator which causes the second clamp to present the second end to the said plane and to the first end, so that the workpiece loop thus formed extends downwardly from the ends,
 f. a cutting blade which forms the elongated workpieces from a continuously extruded cylinder resulting from an extruder,
 g. a take-up area between the cutting blade and the extruder, and
 h. accumulation means to indicate when a predetermined length of the extruded cylinder has accumulated within the area.

14. Apparatus as recited in claim 13, wherein the elongated workpiece have a longitudinally-directed concave groove and each of the clamps include a protuberance of shape corresponding to the groove and positioned to engage the groove when the ends of the workpiece are held by the clamps.

15. Apparatus as recited in claim 13, wherein the first clamp is rotatable on a first pivot which is fixed with respect to the base and the second clamp is rotatable on a second pivot which is movable with respect to the base.

16. Apparatus as recited in claim 15, wherein the positioning means and the manipulator each rotate their corresponding clamp 180° on the pivots from a first position to a second position when the workpiece is held on the clamp, the ends of the workpieces being directed away from each other in the first position and toward each other in the second position.

17. Apparatus as recited in claim 15, wherein said manipulator includes a first actuator and a second actuator which can, from time to time, override the first actuator, said actuators being used to change the spatial relationship between the second pivot and the base.

18. Apparatus as recited in claim 13, wherein a biasing means is provided which maintains a predetermined distance between the plane and the first end at all times except when the second end is in contact with the first end.

19. Apparatus as recited in claim 13, wherein each clamp consists of a fixed jaw and a movable jaw that moves vertically to grasp the workpiece.

20. Apparatus as recited in claim 13, wherein means is provided to form the workpiece into a downwardly-extending storage loop before it arrives at the clamps.

21. Apparatus as recited in claim 13, wherein electrical controls including a photocell is operable by the hight of the storage loop to start a clamping cycle.

22. Apparatus as recited in claim 13, wherein the first clamp grasps the first end of the workpiece, and then moves longitudinally to measure a required length of workpiece.

23. Apparatus as recited in claim 13, wherein the second clamp grasps the second end of the workpiece after the first clamp has completed its longitudinal movement.

24. Apparatus as recited in claim 13, wherein the clamps rotate 180° downwardly toward one another.

25. Apparatus as recited in claim 13, wherein the apparatus is free of impediment under the space between the clamps, so that the said workpiece loop is free to form and to drop downwardly when completed.

26. Apparatus for the production of annular articles from elongated workpieces, the elongated workpieces having a first and a second end, comprising:
   a. a base,
   b. a first clamp movably attached to the base and adapted to grasp the first end of the workpiece,
   c. a second clamp movably attached to the base and adapted to grasp the second end of the workpiece,
   d. positioning means for presenting the first end of the workpiece to an imaginary traverse plane, and
   e. a manipulator which causes the second clamp to present the second end to the said plane and to the first end, so that the workpiece loop thus formed extends downwardly from the ends,
   the elongated workpieces having a longitudinally-directed concave groove and each of the clamps including a protuberance of a shape corresponding to the groove and positioned to engage the groove when the ends of the workpiece are held by the clamps.

27. Apparatus for the production of annular articles from elongated workpieces, the elongated workpieces having a first and a second end, comprising:
   a. a base,
   b. a first clamp movably attached to the base and adapted to grasp the first end of the workpiece,
   c. a second clamp movably attached to the base and adapted to grasp the second end of the workpiece, the first clamp being rotatable on a first pivot which is fixed with respect to the base and the second clamp being rotatable on a second pivot which is movable with respect to the base,
   d. positioning means for presenting the first end of the workpiece to an imaginary traverse plane, and
   e. a manipulator which causes the second clamp to present the second end to the said plane and to the first end, so that the workpiece loop thus formed extends downwardly from the ends.

28. Apparatus for the production of annular articles from elongated workpieces, the elongated workpieces having a first and a second end, comprising:
   a. a base,
   b. a first clamp movably attached to the base and adapted to grasp the first end of the workpiece,
   c. a second clamp movably attached to the base and adapted to grasp the second end of the workpiece,
   d. positioning means for presenting the first end of the workpiece to an imaginary traverse plane, and
   e. a manipulator which causes the second clamp to present the second end to the said plane and to the first end, so that the workpiece loop thus formed extends downwardly from the ends,
   f. means to form the workpiece into a downwardly-extending storage loop before it arrives at the clamps, and
   g. electrical controls including a photocell operable by the bight of the storage loop to start a clamping cycle.

29. Apparatus for the production of annular articles from elongated workpieces, the elongated workpieces having a first and a second end, comprising:
   a. a base,
   b. a first clamp movably attached to the base and adapted to grasp the first end of the workpiece,
   c. a second clamp movably attached to the base and adapted to grasp the second end of the workpiece,
   d. positioning means for presenting the first end of the workpiece to an imaginary traverse plane, and
   e. a manipulator which causes the second clamp to present the second end to the said plane and to the first end, so that the workpiece loop thus formed extends downwardly from the ends, the first clamp grasping the first end of the workpiece and then moving longitudinally to measure a required length of workpiece.

30. Apparatus for the production of annular articles from elongated workpieces, the elongated workpieces having a first and a second end, comprising:
   a. a base,
   b. a first clamp movably attached to the base and adapted to grasp the first end of the workpiece,
   c. a second clamp movably attached to the base and adapted to grasp the second end of the workpiece,
   d. positioning means for presenting the first end of the workpiece to an imaginary traverse plane, and
   e. a manipulator which causes the second clamp to present the second end to the said plane and to the first end, so that the workpiece loop thus formed extends downwardly from the ends, the second clamp grasping the second end of the workpiece after the first clamp has completed its longitudinal movement.

* * * * *